(12) United States Patent
Hasegawa et al.

(10) Patent No.: US 12,292,593 B2
(45) Date of Patent: May 6, 2025

(54) LIGHTING DEVICE

(71) Applicant: Japan Display Inc., Tokyo (JP)

(72) Inventors: Makoto Hasegawa, Tokyo (JP); Masafumi Okada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/366,773

(22) Filed: Aug. 8, 2023

(65) Prior Publication Data

US 2023/0375775 A1    Nov. 23, 2023

Related U.S. Application Data

(63) Continuation of application No. PCT/JP2021/044267, filed on Dec. 2, 2021.

(30) Foreign Application Priority Data

Feb. 10, 2021    (JP) ................. 2021-019581

(51) Int. Cl.
*F21V 8/00*    (2006.01)

(52) U.S. Cl.
CPC ......... *G02B 6/0073* (2013.01); *G02B 6/0036* (2013.01); *G02B 6/0053* (2013.01); *G02B 6/0075* (2013.01)

(58) Field of Classification Search
CPC .. G02B 6/0073; G02B 6/0036; G02B 6/0053; G02B 6/0075
See application file for complete search history.

(56) References Cited

U.S. PATENT DOCUMENTS

2015/0029745 A1*  1/2015  Asano ............... G02B 6/005
                                                    362/625
2015/0293296 A1* 10/2015  Kikuchi ........... G02B 6/0038
                                                    362/606

(Continued)

FOREIGN PATENT DOCUMENTS

JP    2009-076374 A    4/2009
JP    2009-181772 A    8/2009

(Continued)

OTHER PUBLICATIONS

International Search Report mailed on Jan. 25, 2022 for the corresponding PCT Application No. PCT/JP2021/044267, with machine English translation.

*Primary Examiner* — Christopher E Dunay
(74) *Attorney, Agent, or Firm* — Michael Best & Friedrich LLP (57) ABSTRACT

A lighting device capable of changing light direction includes: a light guide plate having a first side surface extending in a first direction; and LEDs at the first side surface, in which the light guide plate has a first area extending in a second direction which is a direction perpendicular to the first direction and a second area extending in the second direction and adjacent to the first area, corresponding to the first area, at least one LED is arranged at the first side surface, corresponding to the second area, at least one LED is arranged at the first side surface, a first prism array is formed under a bottom surface of the first area, and a second prism array is formed under a bottom surface of the second area, and a prism height of the second prism array is taller than a prism height of the first prism array.

10 Claims, 7 Drawing Sheets

(56) References Cited

U.S. PATENT DOCUMENTS

| | | | | |
|---|---|---|---|---|
| 2017/0205558 A1* | 7/2017 | Hirayama | ............ | G02B 6/0055 |
| 2019/0025657 A1 | 1/2019 | Presniakov et al. | | |
| 2022/0390661 A1* | 12/2022 | Yagi | .................... | G02B 6/0036 |
| 2023/0417978 A1* | 12/2023 | Kanbayashi | ......... | G02B 6/0088 |

FOREIGN PATENT DOCUMENTS

| | | |
|---|---|---|
| JP | 2011-014520 A | 1/2011 |
| JP | 2012-069409 A | 4/2012 |

* cited by examiner

LIGHTING DEVICE

CLAIM OF PRIORITY

The present application is a continuation application of International Application No. PCT/JP2021/044267, filed on Dec. 2, 2021, which claims priority to Japanese Patent Application No. 2021-019581, filed on. Feb. 10, 2021. The contents of these applications are incorporated herein by reference in their entirety.

BACKGROUND OF THE INVENTION

1. Field of the Invention

The present invention relates to a thin lighting device that can easily switch the exit direction of light or can cause collimated light to exit in a plurality of directions.

2. Description of the Related Art

There is a demand for projection of collimated light to each seat of an airplane or a train. In addition, it is desired to cause light to be emitted at different angles in or from an automobile or the like depending on purposes in some cases. On the other hand, it is desired to cause light to be emitted at different angles from a light source in some cases. In such a case, for example, available means include: changing the angle of the light source; arranging a reflection board to change the exit angle of exit light from the light source; arranging a lens to change the exit angle of exit light from the light source; and so on.

JP 2012-069409 A describes configuration to change the angle of light that exits one light source. JP 2012-069409 A describes configuration in which refraction means for changing the angle of exit light is placed on a light source which faces directly downward. As the refraction means, the use of a lens, a prism, a liquid lens, a liquid crystal lens, or the like is described.

US 2019/0025657 A1 describes configuration to control a light beam shape by using a liquid crystal lens.

SUMMARY OF THE INVENTION

In a case where collimated light is projected to each seat of an airplane or a train, or in a case where it is desired to cause light to be emitted at different angles in or from an automobile or the like depending on functions, for example, a lighting device may be arranged for each seat of the airplane or the like; however, in this case, the number of pieces of lighting equipment increases, and their weights and the space occupied by them become a problem.

Although it is also possible to change the exit angle of light exiting one light source by rotating the light source in order to change the direction of the light, in this case, a mechanical driving device is necessary, undesirably increasing the size of the lighting device. In addition, a size increase of a device due to the arrangement of the light refraction means becomes a problem in the case of the method in which the refraction means is arranged on the exit side of a light source; furthermore, means for driving the refraction means also is necessary.

An object of the present invention is to realize a lighting device that is thin, is not space-consuming, and additionally can easily change the exit angle of light. In addition, another object of the present invention is to realize a lighting device that is thin, is not space-consuming, and additionally can release collimated exit light in a plurality of directions.

The present invention solves the problems described above, and main specific means are as follows.

(1) A lighting device including: a light guide plate having a first side surface extending in a first direction and a second side surface arranged opposite to the first side surface and extending in the first direction; and light-emitting diodes that are arranged at the first side surface or the second side surface, in which the light guide plate has a first area extending in a second direction which is a direction perpendicular to the first direction and a second area extending in the second direction and adjacent to the first area, corresponding to the first area, at least one light-emitting diode is arranged at the first side surface or the second side surface, corresponding to the second area, at least one light-emitting diode is arranged at the first side surface or the second side surface, a first prism array is formed under a bottom surface of the first area, and a second prism array is formed under a bottom surface of the second area, and a prism height of the second prism array is taller than a prism height of the first prism array.

(2) The lighting device according to (1), in which a prism pitch of the second prism array is greater than a prism pitch of the first prism array.

(3) The lighting device according to (1), in which a prism vertex angle of the second prism array is smaller than a prism vertex angle of the first prism array.

(4) The lighting device according to (1), in which an extending direction of the first prism array is the first direction, and an extending direction of the second prism array is the first direction.

(5) The lighting device according to claim 1, in which a direction of light that exits from the first area is a normal direction of a main surface of the light guide plate, and a direction of light that exits from the second area is at an angle relative to the normal direction of the main surface of the light guide plate.

(6) A lighting device including: a first light guide plate on which first light-emitting diodes are arranged at a first side surface extending in a first direction; and a second light guide plate on which second light-emitting diodes are arranged at a second side surface extending in the first direction, the first light guide plate and the second light guide plate being overlappingly arranged, in which the first light guide plate has a first area extending in a direction perpendicular to the first direction and a third area extending in the second direction and adjacent to the first area, a first prism array is formed under a bottom surface of the first area, a prism array is not formed under a bottom surface of the third area, the second light guide plate has a second area extending in the second direction and a fourth area extending in the second direction and adjacent to the second area, a second prism array is formed under a bottom surface of the second area, a prism array is not formed under a bottom surface of the fourth area, when seen in a plan view, the first area and the fourth area overlap, and the second area and the third area overlap, and a prism height of the prism array in the second area is taller than a prism height of the prism arrays in the first area.

(7) The lighting device according to (6), in which the first light guide plate is arranged on the second light guide plate.

(8) The lighting device according to (6), in which a prism pitch of the second prism array is greater than a prism pitch of the first prism array.

(9) The lighting device according to (6), in which a prism vertex angle of the second prism array is smaller than a prism vertex angle of the first prism array.

(10) The lighting device according to (6), in which an extending direction of the first prism array is the first direction, and an extending direction of the second prism array is the first direction.

(11) The lighting device according to (6), in which a direction of light that exits from the first area is a normal direction of a main surface of the first light guide plate, and a direction of light that exits from the second area is at an angle relative to the normal direction of the main surface of the second light guide plate.

DETAILED DESCRIPTION OF THE PREFERRED EMBODIMENTS

Hereinbelow, the present invention is explained in detail with reference to embodiments.

First Embodiment

Figure 1:
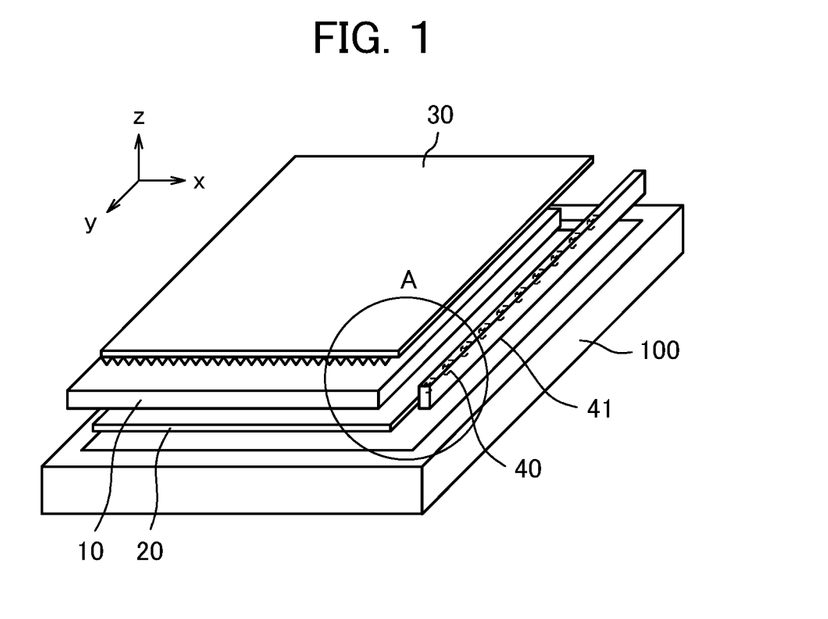
FIG. 1 is a perspective view of a lighting device according to a first embodiment.

FIG. 1 is an exploded perspective view depicting the basic configuration of a lighting device according to the present invention. As depicted in FIG. 1, a feature of the present invention is a side light scheme in which light-emitting diodes (LEDs) 40 are arranged at a first side surface of a light guide plate 10. The light guide plate 10 includes: the first side surface extending in the Y-direction (first direction); a second side surface arranged opposite to the first side surface; a third side surface and a fourth side surface orthogonal to the first side surface and the second side surface and extending in the X-direction (second direction); a front plane orthogonal to the first side surface to the fourth side surface; and a rear surface arranged opposite to the front plane in the Z-direction (third direction).

The side light scheme allows reduction of the thickness of the lighting device. In FIG. 1, the LEDs 40 are arranged to face the first side surface of the light guide plate 10, and the LEDs 40 are arranged at constant intervals in the Y-direction. As explained later, the shapes of prisms formed under the bottom surface of the light guide plate 10 differ correspondingly to the respective LEDs 40, and angles of light that exits the light guide plate are different from each other depending on from which areas the light exits the light guide plate.

A reflection sheet 20 is arranged at the bottom surface of the light guide plate 10. The reflection sheet 20 reflects light advancing downward from the light guide plate 10, and directs the light upward toward the exit-surface side. For example, a silver deposition film or an enhanced specular reflector (ESR) which is a product of 3M can be used as the reflection sheet 20. Its thickness is approximately 70 μm, for example.

In FIG. 1, the light guide plate 10 is arranged on the reflection sheet 20. The thickness of the light guide plate 10 is approximately 2 mm. The light guide plate 10 has a role of directing light from the LEDs 40 having entered the light guide plate 10 from the side surface, such that the light advances upward toward the exit surface. Light advancing toward the bottom surface of the light guide plate 10 is reflected upward toward the exit surface by the reflection sheet 20.

The light guide plate 10 has prism arrays formed on its top surface and bottom surface in order for the top surface and the bottom surface to serve as surface light sources that cause light having entered from the side to exit from those main surfaces efficiently. The prism arrays formed on the top surface and bottom surface of the light guide plate 10 are very different from a prism array formed on a prism sheet 30 and a prism array that is in some cases formed on a light guide plate used for a display device or the like.

In particular, prisms formed under the bottom surface of the light guide plate 10 determine angles of exit from the light guide plate, and each type of area corresponding to an exit angle has a different type of prism, which defines a feature of the present invention. The light guide plate 10, the LEDs 40, the reflection sheet 20, the prism sheet 30, and the like are housed in an outer frame 100. The lighting device in FIG. 1 can have a smaller thickness since it adopts the side light scheme.

Figure 2:
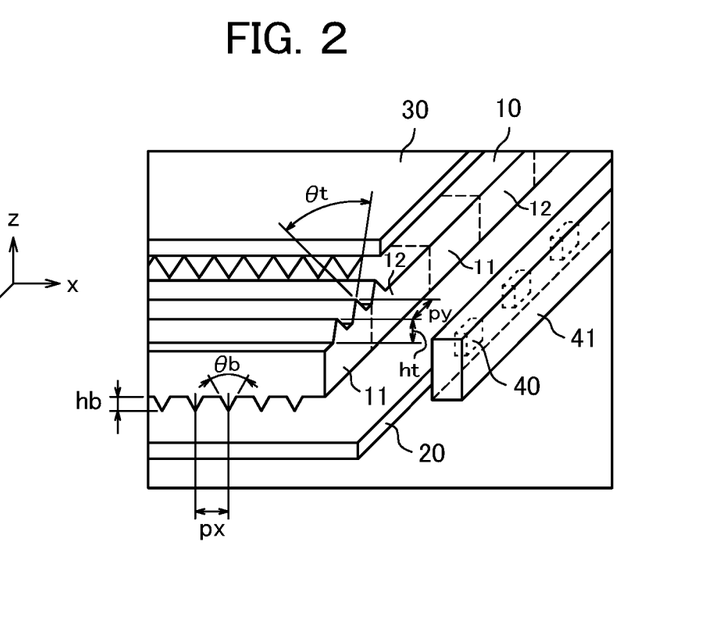
FIG. 2 is a detailed diagram of a portion A in FIG. 1.

FIG. 2 is a detailed perspective view of an area A surrounded by a circle in FIG. 1. The outer frame 100 is omitted in FIG. 2. A prism array extending in the x-direction is formed on the top surface of the light guide plate 10. Protrusions of the prism array extend in the x-direction, and are arrayed in the y-direction. The protrusion height ht is 0.1 μm, for example, and the protrusion pitch py of the is 0.2 μm, for example. The prism vertex angle θt is 90 degrees, for example.

In FIG. 2, the LEDs 40 mounted on an LED board 41 are arranged to face a side surface of the light guide plate 10. Areas 11 extending in the x-direction and areas 12 extending in the x-direction are formed on the light guide plate 10 repeatedly in the y-direction corresponding to the LEDs 40 arranged at the side. Then, directions of light that exits the light guide plate 10 differ depending on whether it exits from the areas 11 or the areas 12. This is achieved by making prism arrays formed under the bottom surface of light guide plate 10 different from each other depending on whether they are formed in the areas 11 or the areas 12.

Whereas dotted lines are depicted on the boundaries between the areas 11 and the areas 12 in FIG. 2, actually there are no such partitions like dotted lines. Note that there can be cases where partitions such as notches are formed in order to prevent interference between the areas 11 and the areas 12. The prism arrays extending in the y-direction are formed under the bottom surface of the light guide plate 10, and prism arrays extending in the y-direction in the areas 11 are different from prism arrays extending in the y-direction in the areas 12. The prism arrays on the bottom surface of the light guide plate 10 extend in the y-direction, and their prisms are arrayed in the x-direction. The protrusion height hb and pitch px of the prism arrays and the prism vertex angle θb in the areas 11 are significantly different from the protrusion height hb and pitch px of the prism arrays and the prism vertex angle θb in the areas 12.

For example, in a case where the areas 11 are areas where exit light from the light guide plate advances in a perpendicular direction from the light-guide-plate top surface, the protrusion height hb and pitch px of the prism arrays are 0.002 μm and 0.1 μm, respectively, for example. The prism vertex angle is 90 degrees, for example. On the other hand, in a case where the areas 12 are areas where exit light from the light guide plate advances in a direction at an angle θp relative to the normal direction of the light-guide-plate top surface, the protrusion height hb and pitch px of the prism arrays in the area 12 are greater than those in the areas 11. The prism vertex angle is selected such that a necessary deflection angle is attained.

Note that the prism arrays formed on the top surface and bottom surface of the light guide plate 10 can be formed by forming not protrusions, but V-shaped grooves on the surfaces of the light guide plate 10. In addition, whereas an optical sheet arranged on the top surface of the light guide plate 10 is only the prism sheet 30 in FIG. 2, one more prism sheet having a prism array extending in a direction perpendicular to the array on the prism sheet 30 may be overlappingly arranged, as necessary. Furthermore, a diffusion sheet may be arranged on the light guide plate such that the exit light becomes uniform.

Figure 3:
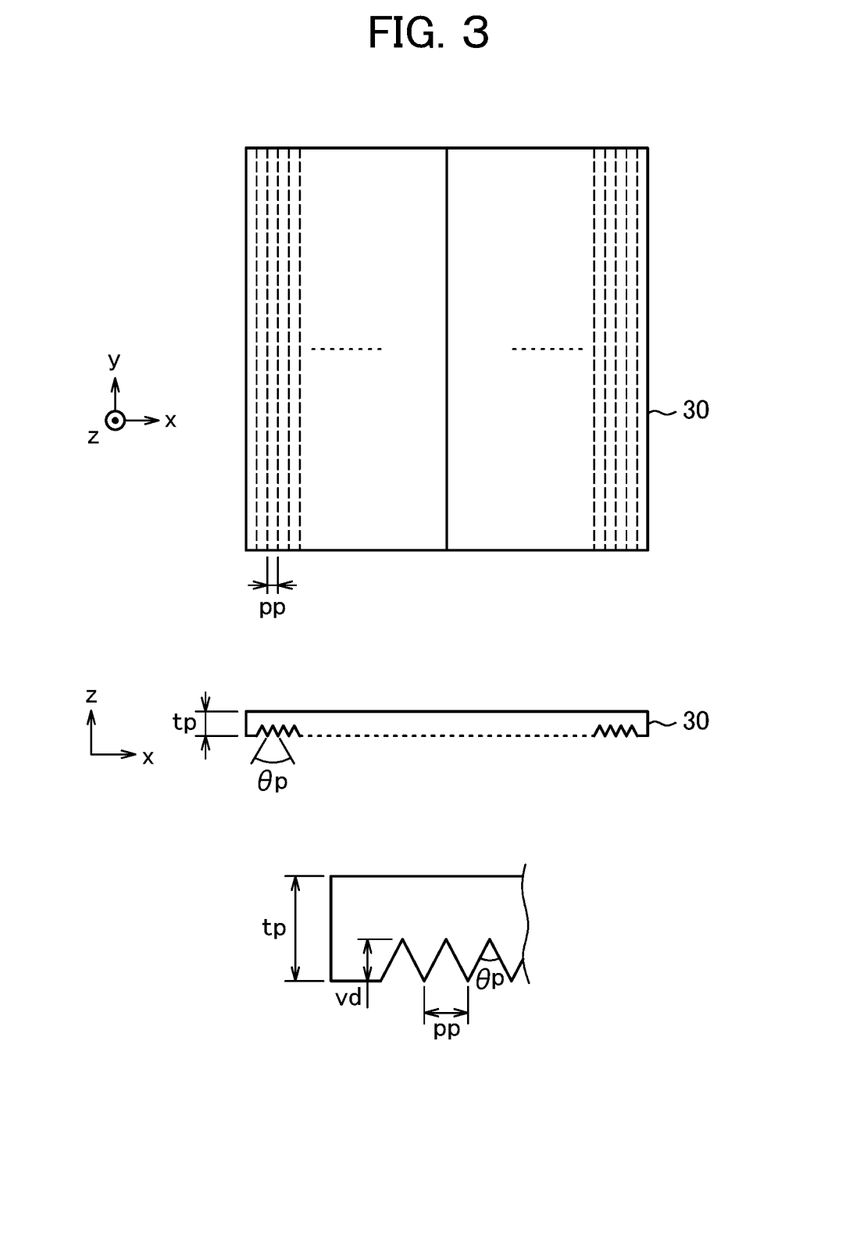
FIG. 3 is a plan view and a cross-sectional view of a prism sheet.

FIG. 3 is a diagram of the prism sheet 30 in a case where a prism array includes V-shaped grooves formed on the prism sheet. The prism sheet in FIG. 3 is a so-called inverse prism sheet. In FIG. 3, the prism array extends in the y-direction, and the V-shaped grooves are arrayed in the x-direction. The following is an example of dimensions of the prism sheet 30. The thickness tp of the prism sheet 30 is 0.125 mm, for example. The depth Vd of the V-shaped grooves is 0.075 mm, for example. The vertex angle θp is 66 degrees, for example. The pitch pp is 0.1 mm, for example. The prism sheet 30 in FIG. 3 has an effect of condensing light that tends to spread in the x-direction, such that it advances in the exit-surface direction, that is, the z-direction.

Figure 4:
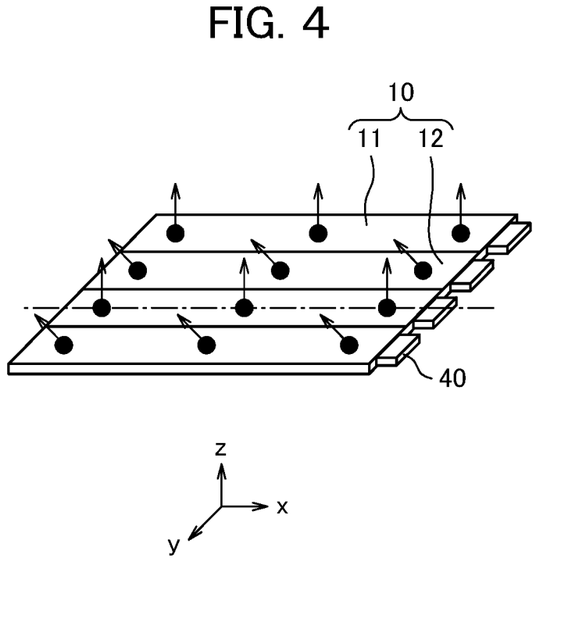
FIG. 4 is a perspective view depicting effects of the first embodiment.

FIG. 4 is a perspective view depicting a portion including only the light guide plate 10 and the LEDs 40 that is taken out for explaining features of the first embodiment. In FIG. 4, the LEDs 40 are arranged with a predetermined pitch at a side surface of light guide plate 10. On the light guide plate 10, the areas 11 and the area 12 are formed corresponding to the respective LEDs 40. Light exit surfaces of the areas 11 and the areas 12 have rectangular shapes having longer sides extending in the X-direction and shorter sides extending in the Y-direction. Boundary lines between the areas 11 and the areas 12 are depicted for convenience, and such lines are not necessarily necessary for actual products.

Exit light in the areas 11 from the top surface of the light guide plate 10 advances in the normal direction of the light-guide-plate top surface, and exit light in the areas 12 from the top surface of the light guide plate 10 advances at a predetermined angle relative to the normal direction of the light-guide-plate top surface. Accordingly, light can be caused to exit in two directions with different angles.

A difference between the areas 11 and the areas 12 resides in the prism arrays formed under the bottom surface of the light guide plate 10 that extend in the y-direction, and have prisms arrayed in the x-direction. As prism arrays for the areas 11, prism arrays that cause light from the LEDs 40 that enters from the side surface or light from the reflection sheet 20 to advance in the normal direction of the top surface of the light guide plate 10 are chosen. Specifically, prism arrays like the ones explained with reference to FIG. 2 having a very short prism height and a very small prism pitch are chosen.

On the other hand, since the direction of light needs to be changed to a predetermined direction actively by the prism arrays in the areas 12, the effect of the prisms needs to be made stronger. Accordingly, the prism height hb needs to be increased further, and correspondingly the prism array pitch px needs to be increased further. The prism vertex angle θb is selected such that the advancing direction of light can be changed, but the vertex angle θb in the areas 12 is smaller than the vertex angle θb in the areas 11 in many cases.

Figure 5:
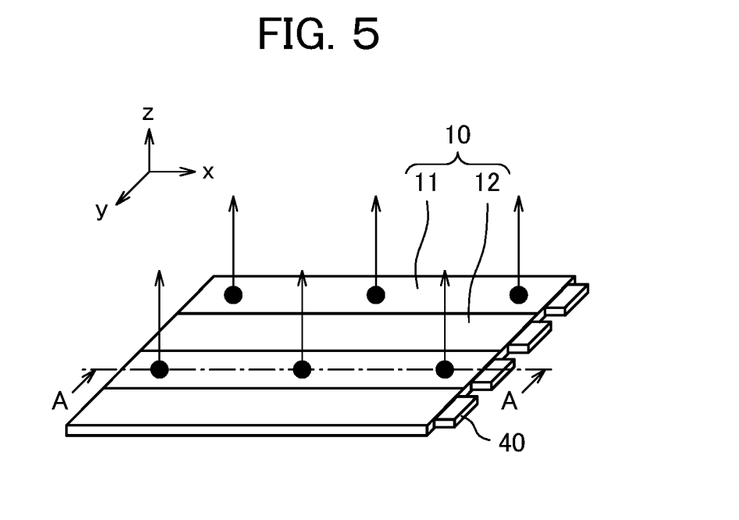
FIG. 5 is a perspective view depicting effects of the first embodiment.

FIG. 5 to FIG. 8 depict examples of cases where directions of exit light are changed with the same configuration as the configuration depicted in FIG. 4. FIG. 5 depicts a case where exit light is caused to exit in a direction perpendicular to the top surface of the light guide plate 10. The configuration depicted in FIG. 5 is the same as the configuration depicted in FIG. 4, but is different from FIG. 4 in that only LEDs 40 corresponding to the areas 11 are turned on, and LEDs 40 corresponding to the areas 12 are not turned on in FIG. 5. Accordingly, exit light includes only light that advances in a direction perpendicular to the top surface of the light guide plate 10.

Figure 6:
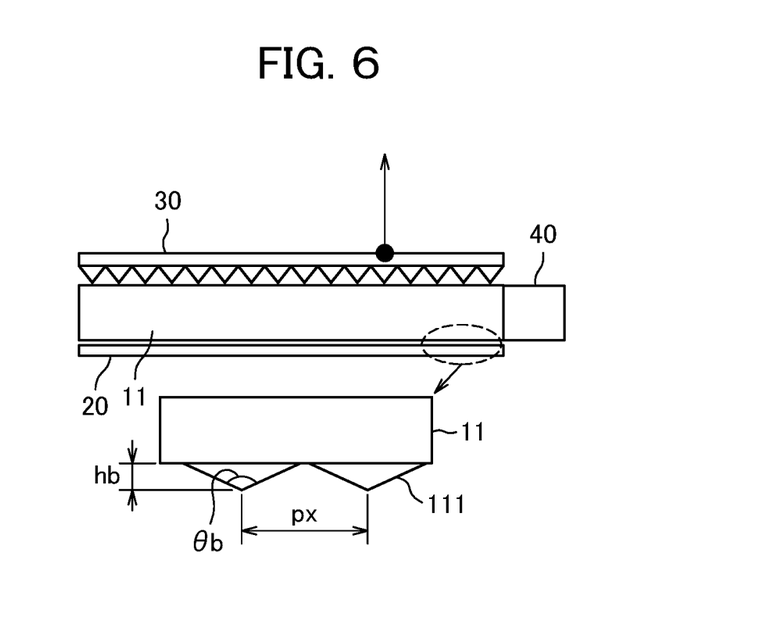
FIG. 6 is a cross-sectional view taken along A-A in FIG. 5.

FIG. 6 is a cross-sectional view taken along A-A in FIG. 5. The basic configuration depicted in FIG. 6 is similar to that explained with reference to FIG. 2. The bottom diagram in FIG. 6 is an enlarged view of the light guide plate 10. The prism array on the top surface of the light guide plate 10 is omitted. FIG. 6 depicts a feature of prism arrays on the bottom surface of the light guide plate 10. Since FIG. 6 is a cross-sectional view of an area 11, light from the light guide plate 10 is caused to exit in the normal direction of the top surface of the light guide plate 10. The height hb of prisms 111 on the bottom surface of the prism arrays in FIG. 6 is 0.02 μm, for example. The pitch px is 0.1 μm, for example. The prism vertex angle θb is 136 degrees. Note that this is an example, and it is sufficient if the prism arrays are formed in such a shape that exit light is collimated in the normal direction of the top surface of the light guide plate 10.

Figure 7:
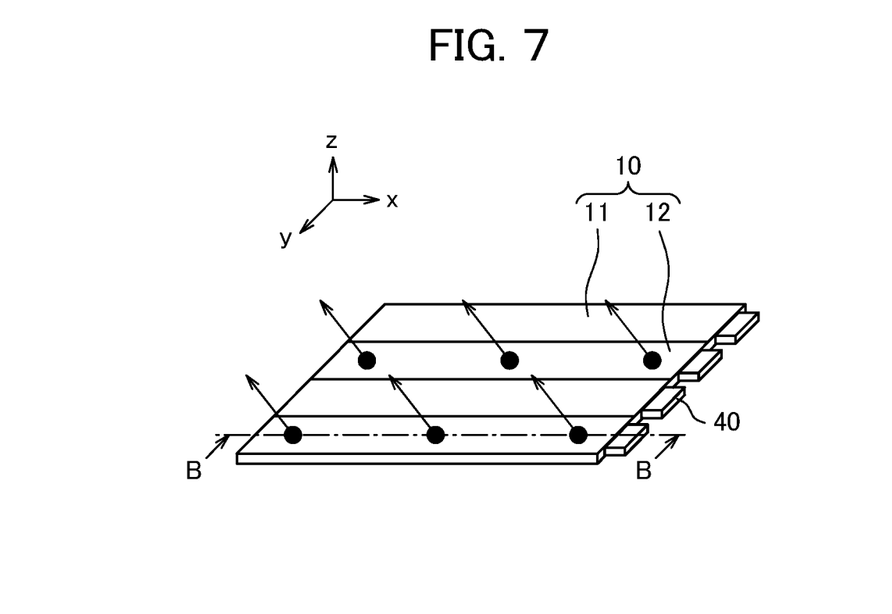
FIG. 7 is a perspective view depicting effects of the first embodiment.

FIG. 7 depicts a case where exit light is caused to exit in a direction at a predetermined angle relative to the normal direction of the top surface of the light guide plate 10. The configuration depicted in FIG. 7 is the same as the configuration depicted in FIG. 4, but is different from FIG. 4 in that only LEDs 40 corresponding to the areas 12 are turned on, and LEDs 40 corresponding to the areas 11 are not turned on in FIG. 7. Accordingly, exit light includes only light that exits at a predetermined angle relative to the normal direction of the top surface of the light guide plate 10.

Figure 8:
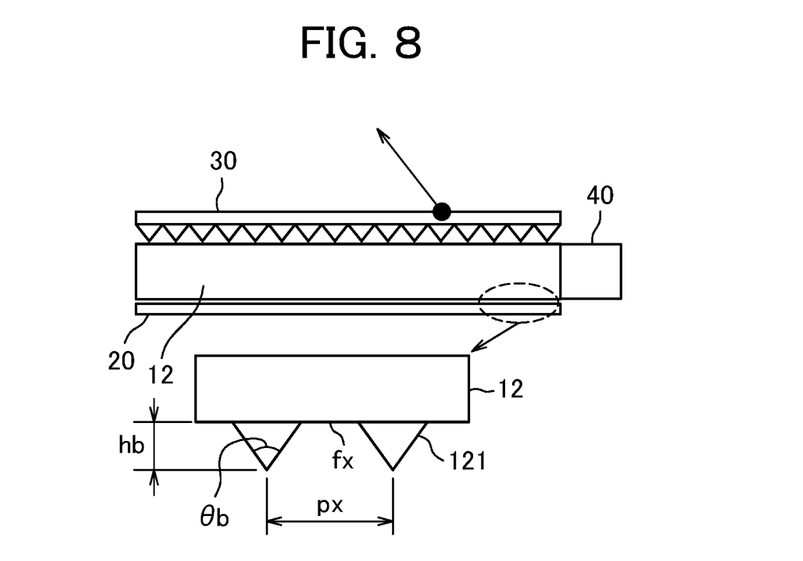
FIG. 8 is a cross-sectional view taken along B-B in FIG. 7.

FIG. 8 is a cross-sectional view taken along B-B in FIG. 7. The basic configuration depicted in FIG. 8 is similar to that explained with reference to FIG. 2. The bottom diagram in FIG. 8 is an enlarged view of the light guide plate 10. The prism array on the top surface of the light guide plate 10 is omitted. FIG. 8 depicts a feature of prism arrays on the bottom surface of the light guide plate 10. Since FIG. 8 is a cross-sectional view of an area 12, light from the light guide plate 10 is caused to exit at a predetermined angle relative to the normal direction of the top surface of the light guide plate 10. Accordingly, the prism arrays formed under the bottom surface of the light guide plate 10 need to deflect light more significantly than the prism arrays depicted in FIG. 6 that correspond to the areas 11 do. Accordingly, the height hb and pitch px of prisms 121 in the prism arrays in the FIG. 8 are taller and greater than those in the case depicted in FIG. 6.

In the example depicted in FIG. 8, the prism vertex angle θb is 60 degrees, and is smaller than the prism vertex angle θb in FIG. 6. In addition, there is a flat portion fx between prisms. The height hb, pitch px, and prism vertex angle θb of the prisms 121 in the prism arrays, the width fx of the flat portion, and the like are selected depending on to which degree the angle of exit from the light guide plate 10 is increased.

Meanwhile, if there are no partitions between the areas 11 and the areas 12, light in the areas 11 and light in the areas 12 interfere with each other, and light that is sufficiently collimated in a predetermined direction cannot be emitted in some cases. In order to prevent this, it is sufficient if partitions for preventing mutual interference between light in the areas 11 and light in the areas 12 are formed. That is, partitions like the ones represented by broken lines depicted on the side surface of the light guide plate 10 in FIG. 2 may be formed.

Since these partitions extend in a direction (e.g. the x-direction in FIG. 5) perpendicular to a direction in which LEDs formed on the light guide plate 10 are arrayed (e.g. the y-direction in FIG. 5), they do not become a hindrance for the light from the LEDs to enter the light guide plate 10. As such partitions, it is sufficient if notches are formed in the light guide plate 10, for example. The notches formed in the light guide plate 10 serve as reflection surfaces due to the difference between the refractive indices, and can prevent interference between light in the areas 11 and light in the areas 12.

Such notches are not notches to completely partition the light guide plate 10, but only have to have a depth which is ½ of the thickness of the light guide plate 10 or a depth which is ⅔ of the thickness of the light guide plate, for example. Completely partitioning the light guide plate at the boundaries between the areas 11 and the areas 12 is advantageous in terms of prevention of interference, but, in this case, for example, it is sufficient if the areas 11 and 12 of the light guide plate 10 are arranged in parallel on the reflection sheet 20.

Note that whereas one LED 40 is arranged at a side surface for each of the areas 11 or the areas 12 in FIG. 4, FIG. 5, and FIG. 7, this is not the sole example, and the LEDs may also be arranged at opposite side surfaces of the light guide plate 10. For example, in another possible manner of configuration, LEDs for the areas 11 are arranged at the right side surface in FIG. 4 or the like, and LEDs for the areas 12 are arranged at the left side surface in FIG. 4 or the like, and so on.

Second Embodiment

Figure 9:
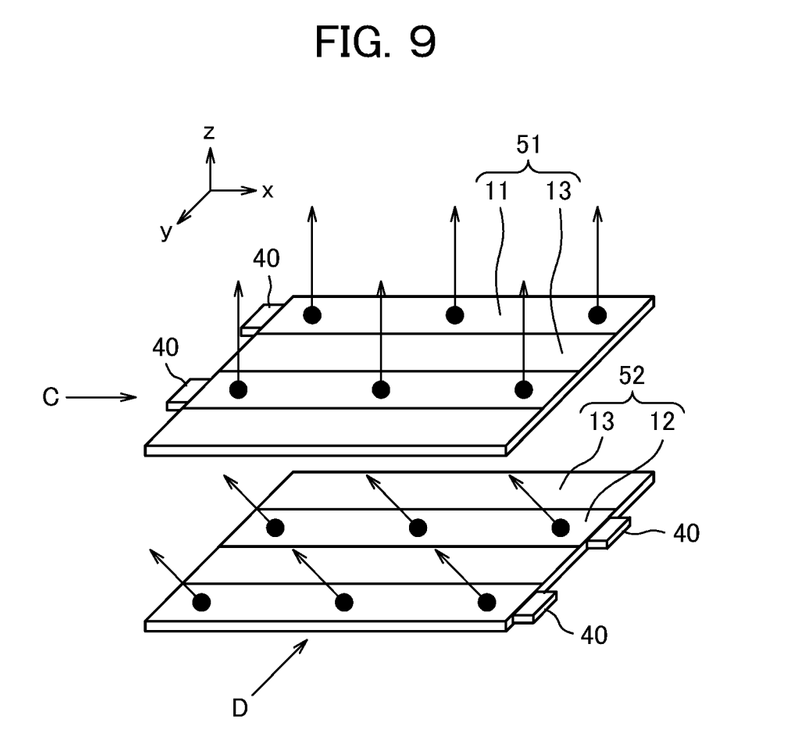
FIG. 9 is a perspective view of a second embodiment.

FIG. 9 is an exploded perspective view depicting characteristic configuration of a second embodiment. The configuration in FIG. 9 has a feature that two light guide plates, light guide plates 51 and 52, are used overlappingly. In other respects, the configuration according to the second embodiment is similar to the configuration explained with reference to FIG. 2. That is, the prism sheet 30 is arranged on the upper light guide plate 51, and the reflection sheet 20 is arranged under the lower light guide plate 52.

In FIG. 9, the upper light guide plate 51 has separate areas 11 and areas 13. LEDs 40 are arranged corresponding to the areas 11. LEDs 40 are not arranged for the areas 13. In the areas 11, prism arrays like the ones explained with reference to FIG. 6 are formed under the bottom surface of the light guide plate 51. Prism arrays like the ones explained with reference to FIG. 2 are formed on the top surfaces of the areas 11. With such configuration, light having entered from the LEDs 40 arranged at a side surface can be caused to exit in the normal direction of the top surface of the light guide plate 51.

In the areas 13, prism arrays are formed on neither of the top surface nor the bottom surface of the light guide plate 51. Since the areas 13 have a role of allowing light having exited from the lower light guide plate 52 at an angle relative to the normal direction to pass therethrough directly without changing its angle, it is better to form prism arrays on neither of the top surface nor the bottom surface of the light guide plate 51. It should be noted that prism arrays may be formed only to a degree that does not influence the advancing direction of light.

In FIG. 9, the lower light guide plate 52 has areas 12 and areas 13, which are separated from each other. LEDs 40 are arranged corresponding to the areas 12. LEDs 40 are not arranged for the areas 13. In the areas 12, prism arrays like the ones explained with reference to FIG. 8 are formed under the bottom surface of the light guide plate 52. Prism arrays like the ones explained with reference to FIG. 2 are formed on the top surfaces of the areas 12. With such configuration, light having entered from the LEDs 40 arranged at a side surface can be caused to exit at an angle relative to the normal direction of the top surface of the light guide plate 52.

In the areas 13, prism arrays are formed on neither of the top surface nor the bottom surface of the light guide plate 51. Since the areas 13 on the light guide plate 52 have a role of introducing light from the lower reflection sheet 20 directly to the areas 11 on the upper light guide plate 51, it is better to form prism arrays in the areas 13 on neither of the top surface nor the bottom surface of the light guide plate 52. It should be noted that prism arrays may be formed only to a degree that does not influence the advancing direction of light.

Figure 10:
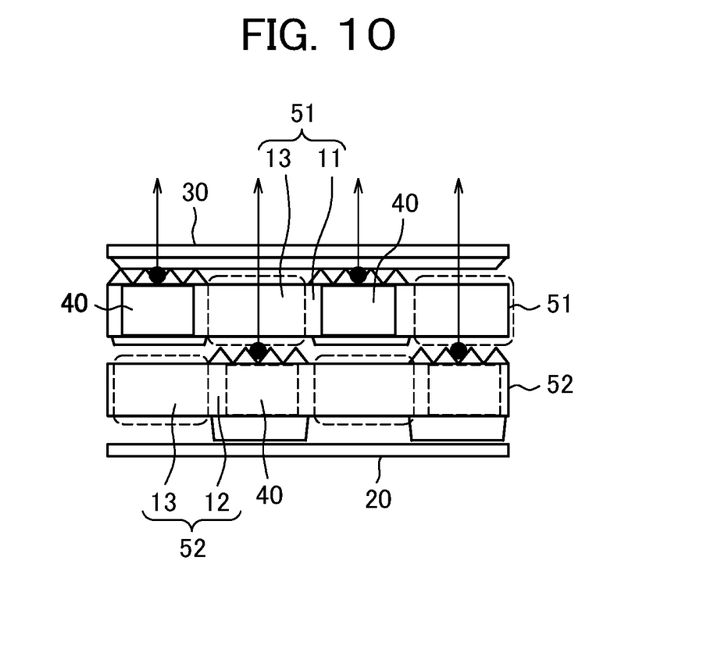
FIG. 10 is a side view of FIG. 9 as seen in a direction C.

FIG. 10 is a side view of the configuration depicted in FIG. 9 as seen in a direction of an arrow C in FIG. 9. Note that in FIG. 10, the reflection sheet 20 and the prism sheet 30 are added to FIG. 9. In FIG. 10, the light guide plate 52 and the light guide plate 51 are arranged between the reflection sheet 20 and the prism sheet 30 in this order from below. In the areas 12 on the lower light guide plate 52, prism arrays like the ones explained with reference to FIG. 8 are formed on the top surface and bottom surface of the light guide plate 52.

In the areas 12, light exits at an angle relative to the normal direction of the top surface of the light guide plate 52. Arrows in FIG. 10 represent exit directions of light, and exit light from the light guide plate 52 also appears to be advancing upward when seen in the direction C in FIG. 9. Since, corresponding to the areas 12, the LEDs 40 are arranged at a side surface of the light guide plate 52 which is on the farther side when seen on the paper surface, the LEDs 40 are represented by dotted lines in FIG. 10.

In the areas 13 on the light guide plate 52 that are surrounded by dotted lines, prism arrays are formed on neither of the top surface nor the bottom surface of the light guide plate 52. Since the areas 13 introduce light from the reflection sheet to the upper light guide plate without changing its advancing direction, prism arrays are not necessary. Note that prism arrays may be formed only to a degree that does not change the advancing direction of light.

In the areas 11 on the upper light guide plate 51, prism arrays like the ones explained with reference to FIG. 6 are formed on the top surface and bottom surface of the light guide plate 51. In the areas 11, light exits in the normal direction of the top surface of the light guide plate 51. LEDs 40 are arranged at side surfaces of the light guide plate 51 that correspond to the areas 11.

In the areas 13 on the light guide plate 51, prism arrays are formed on neither of the top surface nor the bottom surface of the light guide plate 51. Since the areas 13 cause light from the areas 12 on the light guide plate 52 to exit from the light guide plate 51 without changing its advancing direction, prism arrays are not necessary. Note that prism arrays may be formed only to a degree that does not change the advancing direction of light.

Figure 11:
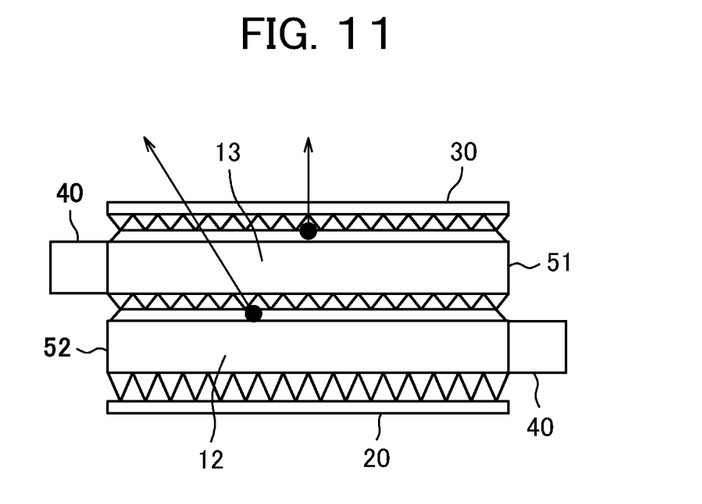
FIG. 11 is a side view of FIG. 9 as seen in a direction D.

FIG. 11 is a side view of the configuration depicted in FIG. 9 as seen in a direction of an arrow D in FIG. 9. In FIG. 11, the light guide plates 52 and 51 are arranged between the reflection sheet 20 and the prism sheet 30 in this order from below. As a side surface of the lower light guide plate 52, a side surface of an area 12 can be seen. Prism arrays like the ones explained with reference to FIG. 8 are formed on the top surface and bottom surface of the light guide plate 52. LEDs 40 are arranged at a side surface of the light guide plate 52.

As a side surface of the light guide plate 51 arranged on the light guide plate 52, a side surface of an area 13 can be seen. In the areas 13, prism arrays are formed on neither of the top surface nor the bottom surface. Prism arrays that can be seen around the upper light guide plate 51 in FIG. 11 are prism arrays formed on the top surface and bottom surface of the areas 11 of the upper light guide plate 51. Whereas LEDs 40 are arranged at the left surface of the upper light guide plate 51, these LEDs 40 are LEDs arranged not at side surfaces of the areas 13, but at side surfaces of the areas 11.

Note that FIG. 9 to FIG. 11 depict cases where LEDs 40 for the upper light guide plate 51 and LEDs 40 for the lower light guide plate 52 are turned on simultaneously. In contrast to this, by turning on only the LEDs 40 for the upper light guide plate 51, it is possible to cause only light that advances in the normal direction of the top surface of the upper light guide plate 51 to exit. In addition, by turning on only the LEDs 40 for the lower light guide plate 52, it is possible to cause only light at a predetermined angle relative to the normal direction of the top surface of the upper light guide plate 51 to exit.

Meanwhile, if there are no partitions between the areas 11 and areas 13 on the light guide plate 51 or between the areas 12 and areas 13 on the light guide plate 52, light in the areas 11 or the areas 12 and light in the areas 13 interfere with each other, and light that is sufficiently collimated in a predetermined direction is not emitted in some cases. In order to prevent this, as explained with reference to the first embodiment, it is sufficient if partitions for preventing mutual interference between light in the areas 11 and light in the areas 13 or light in the areas 12 and light in the areas 13 are formed. As such partitions, it is sufficient if notches are formed in the light guide plates, for example. The notches formed in the light guide plates serve as reflection surfaces due to the difference between the refractive indices, and can prevent interference between light in the areas 11 and light in the areas 13 or between light in the areas 12 and light in the areas 13.

As mentioned above, in the second embodiment also, it is possible to realize a lighting device that can switch the exit direction of light to different advancing directions. Alternatively, it is possible to realize a lighting device that can cause light to exit in two different advancing directions simultaneously. Note that whereas the thickness of the lighting device in the second embodiment increases by an amount corresponding to the addition of one light guide plate as compared with the first embodiment, since the thickness of a light guide plate is as small as approximately 2 mm, such an increase does not have significant influence on the lighting device as a whole.

The configuration depicted in FIG. 9 to FIG. 11 is configuration in which the light guide plate 51 that directs exit light in the normal direction of the top surface of the light guide plate 51 is arranged on the light guide plate 52 that directs exit light in a direction at an angle relative to the normal direction of the top surface of the light guide plate 51. Conversely, similar effects can be attained also with configuration in which the light guide plate 52 is arranged above the light guide plate 51.

In the first embodiment and the second embodiment, light emitted from the areas 11 and light emitted from the areas 12 are distributed over certain ranges. It is sufficient if the angle of light that exits from the areas 11 and the angle of light that exits from the areas 12 relative to the normal line of the top surface of the light guide plate are defined as the angles of portions of those pieces of light at which they have the highest intensity in those ranges.

In the first embodiment and the second embodiment, light from the areas 11 exits in the normal direction of the light-guide-plate top surface. However, this is not the sole example, and by forming, for example, areas 14 instead of the areas 11, it is possible to cause exit light to exit at an angle relative to the normal direction of the top surface of the light guide plate, and additionally make the angle different also from the angle of light that exits from the areas 12. This angle can be realized, for example, by making prism arrays formed under the bottom surface of the light guide plate in the areas 14 different from both prism arrays in the areas 11 and prism arrays in the areas 12.

In a case where it is desired to make the intensity of first exit light that exits in the normal direction from the light guide plate different from the intensity of second exit light that exits in a direction different from the normal direction, it is sufficient if the numbers of the areas 11 and the areas 12 are made different from each other. Alternatively, it is sufficient if the numbers of LEDs arranged for the areas 11 and the areas 12 are made different from each other.

In the first embodiment and the second embodiment, changing the direction of exit from the areas 12 means changing its azimuth in terms of the polar angle in the x-direction. In a case where it is desired to direct light at an angle from the lighting device such that the light advances in a direction other than the x-direction, it is sufficient if the lighting device is installed in a state where the lighting device has been rotated and oriented to the direction in advance. After the installation, it is not necessary to rotate the lighting device itself even in a case where the lighting direction is to be switched.

In the first embodiment and the second embodiment, changing the direction of exit from the areas 12 means changing its azimuth in terms of the polar angle in the x-direction. In a case where it is desired to change the direction of exit from the areas 12 as the azimuth in terms of the polar angle in the y-direction, it is sufficient if the extending direction of the areas 11, areas 12, and areas 13 is a direction perpendicular to the extending direction in the cases of the first and second embodiments, and additionally, a side surface(s) of the light guide plate(s) where LEDs are arranged is/are a side surface(s) extending in a direction perpendicular to the side surface(s) where LEDs are formed in the first embodiment or the second embodiment.

Whereas one LED 40 corresponds to each area 11 or area 12 in the first embodiment and the second embodiment, it is also possible to arrange a plurality of LEDs for each area 11 or area 12 in a case where it is desired to further intensify the illuminance of the lighting device.

In the configuration explained in the first and second embodiments, light is used by switching the direction of the light to either of two directions or light is caused to exit in two directions simultaneously. However, if each piece of exit light can be collimated sufficiently, it is also possible to use light by switching the direction of the light to one of three or more directions or to cause light to exit in three or more directions simultaneously.

What is claimed is:

1. A lighting device comprising:
    a first light guide plate on which a plurality of first light-emitting diodes are arranged at a first side surface along a first direction; and
    a second light guide plate on which a plurality of second light-emitting diodes are arranged at a second side surface along the first direction, the first light guide plate and the second light guide plate being overlappingly arranged, wherein
    the first light guide plate has a first area extending in a second direction perpendicular to the first direction and a third area extending in the second direction and adjacent to the first area,
    a first prism array is formed under a bottom surface of the first area,
    a prism array is not formed under a bottom surface of the third area,
    the second light guide plate has a second area extending in the second direction and a fourth area extending in the second direction and adjacent to the second area,
    a second prism array is formed under a bottom surface of the second area,
    a prism array is not formed under a bottom surface of the fourth area,
    when seen in a plan view, the first area and the fourth area overlap, and the second area and the third area overlap, and
    a prism height of the prism array in the second area is taller than a prism height of the prism arrays in the first area.

2. The lighting device according to claim 1, wherein the first light guide plate is arranged on the second light guide plate.

3. The lighting device according to claim 1, wherein a prism pitch of the second prism array is greater than a prism pitch of the first prism array.

4. The lighting device according to claim 1, wherein a prism vertex angle of the second prism array is smaller than a prism vertex angle of the first prism array.

5. The lighting device according to claim 1, wherein
    an extending direction of the first prism array is the first direction, and
    an extending direction of the second prism array is the first direction.

6. The lighting device according to claim 1, wherein
    a direction of light that exits from the first area is a normal direction of a main surface of the first light guide plate, and
    a direction of light that exits from the second area is at an angle relative to the normal direction of the main surface of the second light guide plate.

7. The lighting device according to claim 1, wherein
    a direction of light that exits from the first area is at a first angle relative to a normal direction of a main surface of the first light guide plate,
    a direction of light that exits from the second area is at a second angle relative to the normal direction of the main surface of the second light guide plate, and
    the second angle is greater than the first angle.

8. The lighting device according to claim 1, wherein the first side surface and the second side surface are arranged on opposite sides when seen in a plan view.

9. The lighting device according to claim 1, wherein the first side surface and the second side surface are arranged on a same side when seen in a plan view.

10. The lighting device according to claim 1, wherein a first notch extending in the second direction is formed on a boundary between the first area and the third area, and a second notch extending in the second direction is formed on a boundary between the second area and the fourth area.

* * * * *